United States Patent
Hayes et al.

(10) Patent No.: US 12,519,377 B2
(45) Date of Patent: Jan. 6, 2026

(54) MECHANICALLY SWITCHABLE ELECTRIC MACHINES FOR ELECTRIFIED PROPULSION

(71) Applicant: Hamilton Sundstrand Corporation, Charlotte, NC (US)

(72) Inventors: Tyler W. Hayes, Rockford, IL (US); Todd A. Spierling, Rockford, IL (US)

(73) Assignee: HAMILTON SUNDSTRAND CORPORATION, Charoltte, NC (US)

( * ) Notice: Subject to any disclaimer, the term of this patent is extended or adjusted under 35 U.S.C. 154(b) by 0 days.

(21) Appl. No.: 18/773,722

(22) Filed: Jul. 16, 2024

(65) Prior Publication Data

US 2025/0158492 A1    May 15, 2025

Related U.S. Application Data

(60) Provisional application No. 63/599,072, filed on Nov. 15, 2023.

(51) Int. Cl.
*H02K 11/30* (2016.01)
*F02C 7/36* (2006.01)
*H02K 7/116* (2006.01)
*H02K 7/18* (2006.01)

(52) U.S. Cl.
CPC ............... *H02K 11/30* (2016.01); *F02C 7/36* (2013.01); *H02K 7/116* (2013.01); *H02K 7/1823* (2013.01); *F05D 2220/76* (2013.01); *F05D 2260/4031* (2013.01)

(58) Field of Classification Search
CPC ...... H02K 11/30; H02K 7/116; H02K 7/1823; F02C 7/36; F02C 7/32; F05D 2220/76; F05D 2260/4031; F05D 2260/4023; B64D 27/33; B64D 31/18; F01D 15/10
See application file for complete search history.

(56) References Cited

U.S. PATENT DOCUMENTS

| | | | |
|---|---|---|---|
| 7,481,062 B2 | 1/2009 | Gaines et al. | |
| 10,443,504 B2 | 10/2019 | Dalal | |
| 11,679,887 B2 | 6/2023 | Jaljal et al. | |
| 2009/0007569 A1 | 1/2009 | Lemmers, Jr. et al. | |
| 2018/0112599 A1* | 4/2018 | Dalal | H02J 4/00 |
| 2023/0250754 A1 | 8/2023 | Muldoon | |

OTHER PUBLICATIONS

Search Report issued in European Patent Application No. 24210204.4; Date of Mailing Apr. 9, 2025 (7 pages).

* cited by examiner

*Primary Examiner* — Joseph Ortega
(74) *Attorney, Agent, or Firm* — CANTOR COLBURN LLP

(57) ABSTRACT

A system includes: a first electrical machine; a motor controller device coupled to the first electrical machine, wherein the motor controller device is configured to convert first power generated by the first electrical machine or provide second power to the first electrical machine; and a set of coupling devices configured to mechanically couple or decouple the first electrical machine and a turbine engine based on a mode of the system. The set of coupling devices includes: a first gearbox coupled to the first electrical machine; a first coupling device between the first gearbox and the turbine engine; a second gearbox; a second coupling device between the second gearbox and the turbine engine; and a third coupling device between the first gearbox and the second gearbox.

19 Claims, 2 Drawing Sheets

MECHANICALLY SWITCHABLE ELECTRIC MACHINES FOR ELECTRIFIED PROPULSION

CROSS-REFERENCE TO RELATED APPLICATIONS

This application claims the benefit of U.S. Provisional Application No. 63/599,072 filed Nov. 15, 2023, the disclosure of which is incorporated herein by reference in its entirety.

BACKGROUND

Example embodiments of the present disclosure pertain to the art of aircraft electrical systems and, in particular, to aircraft electrical architectures that implement a single generator that can be driven by multiple engine spools.

Modern aircraft engines used in aerospace today typically have multiple shafts that rotate to provide thrust to propel an aircraft. Each of these shafts run at different speeds and are typically decoupled, meaning the shafts are not mechanically linked. Each of these shafts can have a motor/generator coupled to them. These shafts can also interface with a mechanical gearbox to support different speeds or multiple electric machines.

BRIEF DESCRIPTION

Disclosed is a system in which a single electric machine (e.g., a generator, a motor) can be shared between the two independent engine spools. Embodiments of the present disclosure which enable the sharing include one or more coupling mechanisms that are configured to couple/decouple the machine to either shaft when commanded through a system or engine controller.

Example embodiments of the present disclosure are directed to a system including: a first electrical machine; a motor controller device coupled to the first electrical machine, wherein the motor controller device is configured to convert first power generated by the first electrical machine or provide second power to the first electrical machine; and a set of coupling devices configured to mechanically couple or decouple the first electrical machine and a turbine engine based on a mode of the system, wherein the set of coupling devices includes: a first gearbox coupled to the first electrical machine; a first coupling device between the first gearbox and the turbine engine; a second gearbox; a second coupling device between the second gearbox and the turbine engine; and a third coupling device between the first gearbox and the second gearbox.

In any one or combination of the embodiments disclosed herein, based on the mode of the system: the first gearbox is configured to transfer first rotational energy between at least two of the turbine engine, the first electrical machine, or a second electrical machine; the second gearbox is configured to transfer second rotational energy between at least two of the turbine engine, the first electrical machine, or the second electrical machine; the third coupling device is configured to transfer third rotational energy between the first gearbox and the second gearbox; or a combination thereof.

In any one or combination of the embodiments disclosed herein, based on the mode of the system: the first coupling device, the second coupling device, and the third coupling device are each in an decoupling state; the first rotational energy is not transferred between any of the turbine engine, the first electrical machine, and the second electrical machine; the second rotational energy is not transferred between any of the turbine engine, the first electrical machine, and the second electrical machine; and the third rotational energy is not transferred between the first gearbox and the second gearbox.

In any one or combination of the embodiments disclosed herein, based on the mode of the system: the first coupling device is in a coupling state and is configured to transfer the first rotational energy between the turbine engine and the first electrical machine; the second coupling device is in a decoupling state, and the second rotational energy is not transferred between any of the turbine engine, the first electrical machine, and the second electrical machine; and the third coupling device is in the decoupling state, and the third rotational energy is not transferred between the first gearbox and the second gearbox.

In any one or combination of the embodiments disclosed herein, based on the mode of the system: the first coupling device is in a coupling state and is configured to transfer the first rotational energy between the turbine engine and the first electrical machine; the second coupling device is in the coupling state and is configured to transfer the second rotational energy between the turbine engine and the second electrical machine; and the third coupling device is in an decoupling state, and the third rotational energy is not transferred between the first gearbox and the second gearbox.

In any one or combination of the embodiments disclosed herein, based on the mode of the system: the first coupling device is in an decoupling state, and the first rotational energy is not transferred between the turbine engine and the first electrical machine; the second coupling device is in the decoupling state, and the second rotational energy is not transferred between the turbine engine and the second electrical machine; and the third coupling device is in a coupling state and is configured to transfer the third rotational energy between the first gearbox and the second gearbox.

In any one or combination of the embodiments disclosed herein, based on the mode of the system: the first coupling device is in a coupling state and is configured to transfer the first rotational energy between at least two of the turbine engine, the first electrical machine, or the second electrical machine; the second coupling device is in an decoupling state, and the second rotational energy is not transferred between the turbine engine and the second electrical machine; and the third coupling device is in the coupling state and is configured to transfer the third rotational energy between the first gearbox and the second gearbox.

In any one or combination of the embodiments disclosed herein, based on the mode of the system: the first coupling device is in a coupling state and is configured to transfer the first rotational energy between at least two of the turbine engine, the first electrical machine, or the second electrical machine; the second coupling device is in the coupling state and is configured to transfer the second rotational energy between at least two of the turbine engine, the first electrical machine, or the second electrical machine; and the third coupling device is in the coupling state and is configured to transfer the third rotational energy between the first gearbox and the second gearbox.

In any one or combination of the embodiments disclosed herein: the first electrical machine includes a low pressure machine; and the second electrical machine includes a high pressure machine.

In any one or combination of the embodiments disclosed herein: the first electrical machine and the second electrical machine each include a low pressure machine.

In any one or combination of the embodiments disclosed herein: the first electrical machine and the second electrical machine each include a high pressure machine.

In any one or combination of the embodiments disclosed herein, the system further includes a control device configured to, based on the mode of the system, control the set of coupling devices in association with at least one of: mechanically coupling or decoupling the first gearbox and the turbine engine; mechanically coupling or decoupling the second gearbox and the turbine engine; and mechanically coupling or decoupling the first gearbox and the second gearbox.

In any one or combination of the embodiments disclosed herein: the first coupling device is mechanically coupled to a first spool of the turbine engine; the second coupling device is mechanically coupled to a second spool of the turbine engine; and the first spool and the second spool are independent of one another.

Example embodiments of the present disclosure are directed to an apparatus including: a set of coupling devices configured to mechanically couple or decouple a first electrical machine and a turbine engine based on a mode associated with the apparatus, wherein the set of coupling devices includes: a first gearbox coupled to the first electrical machine; a first coupling device between the first gearbox and the turbine engine; a second gearbox coupled; a second coupling device between the second gearbox and the turbine engine; and a third coupling device between the first gearbox and the second gearbox.

In any one or combination of the embodiments disclosed herein, based on the mode associated with the apparatus: the first gearbox is configured to transfer first rotational energy between at least two of the turbine engine, the first electrical machine, or a second electrical machine; the second gearbox is configured to transfer second rotational energy between at least two of the turbine engine, the first electrical machine, or the second electrical machine; the third coupling device is configured to transfer third rotational energy between the first gearbox and the second gearbox, or a combination thereof.

In any one or combination of the embodiments disclosed herein, based on the mode associated with the apparatus: the first coupling device is in a coupling state and is configured to transfer the first rotational energy between the turbine engine and the first electrical machine; the second coupling device is in a decoupling state, and the second rotational energy is not transferred between any of the turbine engine, the first electrical machine, and the second electrical machine; and the third coupling device is in the decoupling state, and the third rotational energy is not transferred between the first gearbox and the second gearbox.

In any one or combination of the embodiments disclosed herein, based on the mode associated with the apparatus: the first coupling device is in a coupling state and is configured to transfer the first rotational energy between the turbine engine and the first electrical machine; the second coupling device is in the coupling state and is configured to transfer the second rotational energy between the turbine engine and the second electrical machine; and the third coupling device is in an decoupling state, and the third rotational energy is not transferred between the first gearbox and the second gearbox.

In any one or combination of the embodiments disclosed herein, based on the mode associated with the apparatus: the first coupling device is in an decoupling state, and the first rotational energy is not transferred between the turbine engine and the first electrical machine; the second coupling device is in the decoupling state, and the second rotational energy is not transferred between the turbine engine and the second electrical machine; and the third coupling device is in a coupling state and is configured to transfer the third rotational energy between the first gearbox and the second gearbox.

In any one or combination of the embodiments disclosed herein, based on the mode associated with the apparatus: the first coupling device is in a coupling state and is configured to transfer the first rotational energy between at least two of the turbine engine, the first electrical machine, or the second electrical machine; the second coupling device is in an decoupling state, and the second rotational energy is not transferred between the turbine engine and the second electrical machine; and the third coupling device is in the coupling state and is configured to transfer the third rotational energy between the first gearbox and the second gearbox.

In any one or combination of the embodiments disclosed herein, based on the mode associated with the apparatus: the first coupling device is in a coupling state and is configured to transfer the first rotational energy between at least two of the turbine engine, the first electrical machine, or the second electrical machine; the second coupling device is in the coupling state and is configured to transfer the second rotational energy between at least two of the turbine engine, the first electrical machine, or the second electrical machine; and the third coupling device is in the coupling state and is configured to transfer the third rotational energy between the first gearbox and the second gearbox.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of example and not limitation with reference to the Figures. While the current application is directed to driving generators or motors, FIG. 1 is provided for context.

Figure 1:
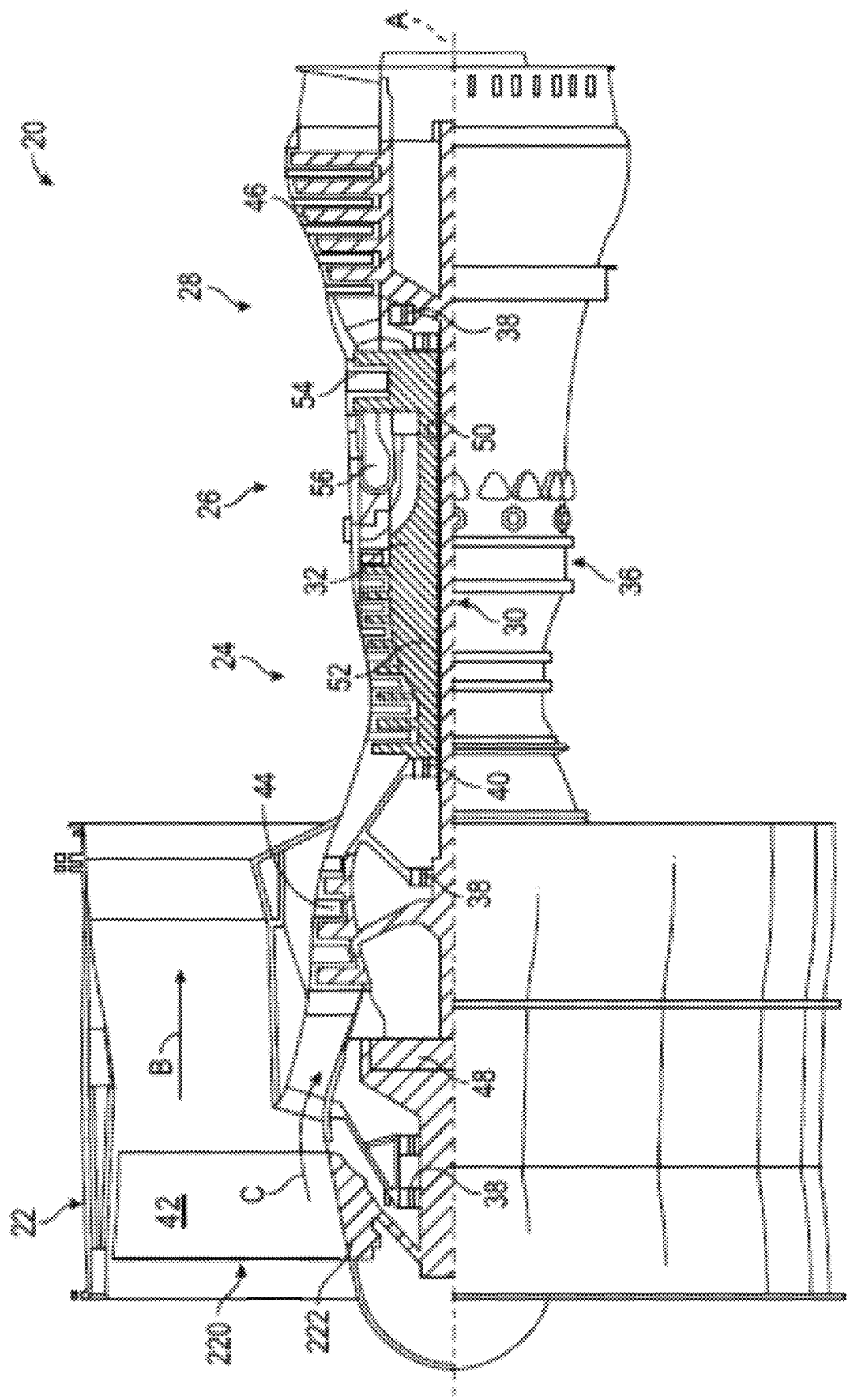
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in example gas turbine engine 20 is illustrated as a geared architecture 48 to drive the fan 42 at a lower speed than the low speed spool 30.

The high speed spool 32 includes an outer shaft 50 that interconnects a high pressure compressor 52 and high pressure turbine 54. A combustor 56 is arranged in example gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

One or more electrical machines (e.g., generators/motors) can be attached to both the low speed spool and the high speed spool. Herein, an electrical machine connected to the low speed spool shall be referred to as a low pressure machine and an electrical machine connected to the high speed spool shall be referred to as a high pressure machine. The skilled artisan will understand that the connection can be may, for example, by rotor blades on the low speed spool and that similar connections can be made on the high speed spool.

Figure 2:
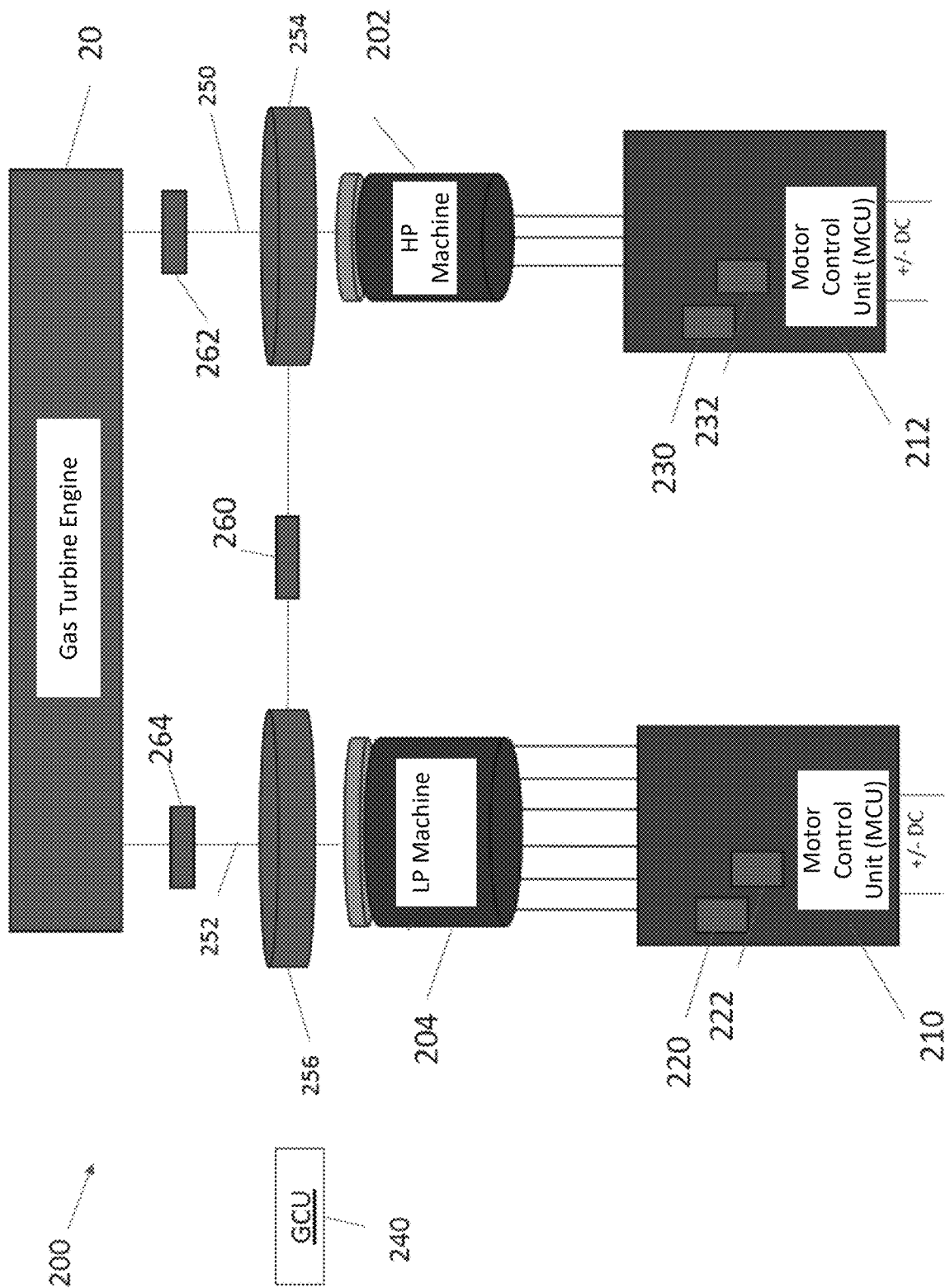
FIG. 2 is a block diagram showing a system according to one embodiment. The system can include only one of the electric machines in one embodiment.

With reference now to FIG. 2, an example system 200 in accordance with one or more embodiments of the present disclosure is shown. As illustrated, the system 200 includes two electrical machines, a high pressure machine 202 and a low pressure machine 204. The system 200 includes the gas turbine 20 of FIG. 1. In some embodiments, the system 200 may include one of the high pressure machine 202 and the low pressure machine 204 and omit the other of the high pressure machine 202 and the low pressure machine 204.

Embodiments of the system 200 are not limited to one electrical machine (e.g., one high pressure machine 202, one low pressure machine 204) on each spool. For example, in some embodiments, the system 200 may include two electrical machines on the high pressure spool and one electrical machine (or two electrical machines) on the low pressure spool, in which the low pressure spool machine is selectively couplable (e.g., by associated mechanical and/or electrical components) to either the low pressure spool or the high pressure spool. In this example, the system 200 may support a configuration in which three electrical machines are coupled to the low pressure spool (e.g., by selective coupling of an electrical machine to the high pressure spool along with two other electrical machines already coupled to the high pressure spool).

In some embodiments, the system 200 may include two electrical machines on the low pressure spool and one electrical machine (or two electrical machines) on the high pressure spool, in which the high pressure spool machine is selectively couplable (e.g., by associated mechanical and/or electrical components) to either the low pressure spool or the high pressure spool. In this example, the system 200 may support a configuration in which three electrical machines are coupled to the low pressure spool (e.g., by selective coupling of an electrical machine to the low pressure spool along with two other electrical machines already coupled to the low pressure spool).

Aspects of the system 200 support sharing a single electric machine (e.g., high pressure machine 202, low pressure machine 204) between two independent engine spools. Descriptions herein with respect to a generator may similarly be applied to a motor. For example, embodiments of the present disclosure support implementations in which the high pressure machine 202 and the low pressure machine 204 may each be a motor or a generator. Embodiments of the present disclosure support implementations in which the high pressure machine 202 and/or the low pressure machine 204 are a machine capable of operating in a motor configuration and a generator configuration.

The system further includes a motor control unit (MCU) 210 (also referred to herein as a first MCU 210 or first motor controller device)). The MCU 210 can be configured such that the MCU 210 can control the low pressure machine 204. In an embodiment, the MCU 210 can optionally be bidirectional. As such, the MCU 210 can include an inverter 220 that receives and converts DC power to AC power and provides the AC power to the low pressure machine 204, which may cause the low pressure machine 204 to operate in a motor configuration and provide energy to the gas turbine 20 of FIG. 1. The inverter 220 can be an active inverter and can be controlled to produce a desired output by either an internal controller or by an external controller such as, for example, generator control unit (GCU 240) (also referred to herein as a control device, a generator control device, or a generator controller) shown in FIG. 2.

The MCU 210 can also be configured such that the MCU 210 converts AC power received from the low pressure machine 206 to a DC voltage and outputs the DC voltage. To that end, the MCU 210 can include a rectifier 222 that receives AC power from the low pressure machine 206 and converts the AC power to DC power. The rectifier 222 can be an active rectifier (e.g., provide rectification using actively controlled switches) and can be controlled to produce a desired output by either an internal controller or by an external controller such as GCU 240 shown in FIG. 2.

The system 200 can also include a motor control unit 212 (also referred to herein as a second MCU 212 or second motor controller device)). The MCU 212 can be configured such that the MCU 212 can control the high pressure machine 202. In an embodiment, the MCU 212 can optionally be bidirectional. As such, the MCU 212 can include an inverter 230 that receives and converts DC power to AC power and provides the AC power to the high pressure machine 202, which may cause the high pressure machine 206 to operate in a motor configuration and provide energy to the gas turbine 20 of FIG. 1. The inverter 220 can be an active inverter and can be controlled to produce a desired output by either an internal controller or by an external controller such as, for example, GCU 240 shown in FIG. 2.

The MCU 212 can also be configured such that the MCU 212 converts AC power received from the high pressure machine 202 to a DC voltage and outputs the DC voltage. To that end, the MCU 212 can include a rectifier 232 that receives AC power from the low pressure machine 206 and converts the AC power to DC power. The rectifier 232 can be an active rectifier (e.g., provide rectification using actively controlled switches) and can be controlled to produce a desired output by either an internal controller or by an external controller such as, for example, GCU 240 shown in FIG. 2.

In operation, the gas turbine engine 20 of FIG. 1 (shown schematically in FIG. 2) can include a high pressure output shaft 250 and a low pressure output shaft 252 that are respectively connected to high pressure gear box 254 and low pressure gear box 256. The high pressure output shaft 250 and low pressure output shaft 252 are respective examples of an outer shaft 50 and an inner shaft 40 described with reference to FIG. 1, and repeated descriptions of like elements are omitted for brevity. The high pressure gear box 254 and low pressure gear box 256 allow rotational energy to be passed from the turbine 20 (e.g., shaft 250, shaft 252) to the high pressure machine 202 and low pressure machine 204 and vice versa.

In an embodiment, a connector 260 (also referred to herein as a coupler/decoupler) is provided. The connector 260 includes a connector coupler/decoupler 262 arranged thereon. The connector coupler/decoupler 262 can be arranged such that torque provided at one end of the connector 260 is either transmitted to the other end (coupled) or not (decoupled). Examples of the connector coupler/decoupler 262 include torque converters, clutches, and the like. Other coupler/decouplers described herein (e.g., connector coupler/decoupler 264, connector 260) can be the same as/similar to the connector coupler/decoupler 262, and repeated descriptions of like elements are omitted for brevity.

The high pressure output shaft 250 and the low pressure output shaft 252 respectively include the high pressure output shaft coupler/decoupler 262 and the low pressure output shaft coupler/decoupler 264. Herein, a coupler/decoupler that is transferring energy/power/torque can be in a "1" state (also referred to herein as a coupling state) and a coupler that is not transferring energy/power/torque can be in a "0" state (also referred to herein as a decoupling state).

Given the configurations of the three coupler/decouplers 260, 262, 264 it shall be clear that there are 8 possible system modes (also referred to herein as states). In some aspects, the system modes may correspond to the configurations of the three coupler/decouplers 260, 262, 264. In the nomenclature below, (x, y, z) refers to the state of the coupler/decouplers 260, 262, 264, respectively. In some aspects, the coupler/decouplers 260, 262, 264 may collectively be referred to as a set of coupling devices or a set of coupling/decoupling devices. Embodiments of the present disclosure support generating electricity based on rotational energy and/or providing rotational energy based on a given system mode described herein.

In a first mode (0,0,0), no energy is passed from the turbine 20 or between the gear boxes 254, 256 as all coupler/decouplers 260, 262, 264 are in the "0" state (e.g., are open).

In a second mode, (0,0,1) the turbine 20 is operably connected to the low pressure machine 204 only. The turbine 20 is disconnected from the high pressure machine 202, and the gear box 256 and gear box 254 are disconnected from each other. The low pressure machine 204 can motor the turbine 20 or receive rotational energy from the turbine 20 and generate electricity.

In a third mode (0,1,0), the turbine 20 is operably connected to the high pressure machine 202 only. The turbine 20 is disconnected from the low pressure machine 204, and the gear box 256 and gear box 254 are disconnected from each other. The high pressure machine 202 can motor the turbine 20 or receive rotational energy from the turbine 20 and generate electricity.

In a fourth mode (0,1,1) the turbine 20 is operably connected to both the high pressure machine 202 and the low pressure machine 204. Both the high pressure machine 202 and the low pressure machine 204 can motor the turbine 20 or receive rotational energy from the turbine 20 and generate electricity. Combinations of both are envisioned. Embodiments of the present disclosure support combinations using the high pressure machine 202 and the low pressure machine 204.

For example, in the fourth mode (0,1,1), both the high pressure machine 202 and the low pressure machine 204 may simultaneously or alternately motor the turbine 20. In another example, in the fourth mode (0,1,1), both the high pressure machine 202 and the low pressure machine 204 may simultaneously or alternately receive rotational energy from the turbine 20 and generate electricity. In some embodiments, for implementations in which the high pressure machine 202 and the low pressure machine 204 are coupled to both spools (high pressure spool, low pressure spool) simultaneously, the system 200 may include an additional transmission element (e.g., a differential or planetary gear set) (not illustrated) to support or compensate for the different rotational speeds of the spools.

In a fifth mode (1,0,0), the turbine 20 in not connected to either the high pressure machine 202 or the low pressure machine 204, and the high pressure machine 202 and the low pressure machine 204 are connected to one another. According to the fifth mode, for example, the low pressure machine 204 may drive the high pressure machine 202 and the high pressure machine 202 may generate electricity if needed.

In a sixth mode (1,0,1), the turbine 20 in connected to the low pressure machine 204, and the high pressure machine 202 and the low pressure machine 204 are connected to one another. According to the sixth mode, for example, the high pressure machine 202 may drive/be driven by the low pressure output shaft 252. As can be seen, in this manner, a single drive shaft (e.g., low pressure output shaft 252) can be connected to both the high pressure machine 202 and the low pressure machine 204. Stated differently, the sixth mode can allow for the high pressure machine 202 to be connected to the low pressure gear box 256.

In a seventh mode (1,1,0), the turbine 20 in connected to the high pressure machine 202, and the high pressure machine 202 and the low pressure machine 204 are connected to one another. According to the seventh mode, for example, the low pressure machine 204 may drive/be driven by the low pressure output shaft 252. As can be seen, in this manner, a single drive shaft (e.g., high pressure output shaft 250) can be connected to both the high pressure machine 202 and the low pressure machine 204. Stated differently, the seventh mode can allow for the low pressure machine 204 to be connected to the high pressure gear box 254.

In an eighth mode (1,1,1), the turbine 20 is connected to high pressure machine 202 and the low pressure machine 204, and the high pressure machine 202 and the low pressure machine 204 are connected to one another. Both the high pressure machine 202 and the low pressure machine 204 can motor the turbine 20 or receive rotational energy from the turbine 20 and generate electricity. The high pressure machine 202 may drive/be driven by the low pressure output shaft 252 and/or the high pressure output shaft 250. The low pressure machine 204 may drive/be driven by the low pressure output shaft 252 and/or the high pressure output shaft 250. In some embodiments, for implementations in which the high pressure machine 202 and the low pressure machine 204 are coupled to both the low pressure output shaft 252 and the high pressure output shaft 250 simultaneously, the system 200 may include an additional transmission element (e.g., a differential or planetary gear set) (not illustrated) to support or compensate for the different rotational speeds of the low pressure output shaft 252 and the high pressure output shaft 250.

As can be seen, in an embodiment, the system 200 may omit one or the other of the high pressure machine 202 and the low pressure machine 204, and by having the connector 260 with the connector coupler/decoupler 262 and the connector coupler/decoupler 264, the system 200 can run on either gearbox/spool described herein or the turbine 20, for example, in the sixth and seventh modes.

Embodiments of the present disclosure are not limited to the high pressure machine 202 and the low pressure machine 204. For example, instead of a low pressure machine 204 and a high pressure machine 202, the system 200 may include two high pressure machines 202 (capable of operating according to the same or different high speeds), two MCUs 212, and two high pressure gear boxes 254 which may be operated based on the modes described herein. In another example, the system 200 may include two low pressure machines 204 (capable of operating according to the same or different low speeds), two MCUs 210, and two low pressure gear boxes 256 which may be operated based on the modes described herein.

In some embodiments, alternative to the example illustrated at FIG. 2, the system 200 may implement the high pressure gear box 254, low pressure gear box 256, connector 260, decoupler 262, and decoupler 264 as a single gearbox having a standalone enclosure, which may provide reduced complexity with respect to system design and total quantity of components.

As described herein in accordance with one or more embodiments of the present disclosure, the system 200 includes a first electrical machine (e.g., low pressure machine 204). The system 200 includes a motor controller device (e.g., MCU 210) coupled to the first electrical machine, wherein the motor controller device is configured to convert first power generated by the first electrical machine or provide second power to the first electrical machine. The system 200 includes a set of coupling devices configured to mechanically couple or decouple the first electrical machine and the gas turbine engine 20 based on a mode of the system 200. The set of coupling devices may include: a first gearbox (e.g., low pressure gear box 256) coupled to the first electrical machine; a first coupling device (e.g., coupler/decoupler 264) between the first gearbox and the turbine engine; a second gearbox (e.g., high pressure gear box 254); a second coupling device (e.g., coupler/decoupler 262) between the second gearbox and the turbine engine; and a third coupling device (e.g., connector 260) between the first gearbox and the second gearbox.

Based on the mode of the system 200: the first gearbox is configured to transfer first rotational energy between at least two of the gas turbine engine 20, the first electrical machine, or a second electrical machine (e.g., high pressure machine 202); the second gearbox is configured to transfer second rotational energy between at least two of the gas turbine engine 20, the first electrical machine, or the second electrical machine; the third coupling device is configured to transfer third rotational energy between the first gearbox and the second gearbox; or a combination thereof.

Gearboxes on aircraft engines today only use the high spool as a means of generating. For more electric or electrified propulsion applications, the low spool of the engine may be used to also turn a generator or be driven by a motor. The high spool can also be motored. A dedicated electric machine would be used on both spools, but embodiments can allow a single machine to be shared for both spools, reducing the weight of the system.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an Example embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
   a first electrical machine;
   a motor controller device coupled to the first electrical machine, wherein the motor controller device is configured to convert first power generated by the first electrical machine or provide second power to the first electrical machine; and
   a set of coupling devices configured to mechanically couple or decouple the first electrical machine and a turbine engine based on a mode of the system,
   wherein the set of coupling devices comprises:
      a first gearbox coupled to the first electrical machine;
      a first coupling device between the first gearbox and the turbine engine;
      a second gearbox;

a second coupling device between the second gearbox and the turbine engine; and
a third coupling device between the first gearbox and the second gearbox, and
wherein, based on the mode of the system:
the first gearbox is configured to transfer first rotational energy between at least two of the turbine engine, the first electrical machine, or a second electrical machine;
the second gearbox is configured to transfer second rotational energy between at least two of the turbine engine, the first electrical machine, or the second electrical machine;
the third coupling device is configured to transfer third rotational energy between the first gearbox and the second gearbox; or
a combination thereof.

2. The system of claim 1, wherein, based on the mode of the system:
the first coupling device, the second coupling device, and the third coupling device are each in an decoupling state;
the first rotational energy is not transferred between any of the turbine engine, the first electrical machine, and the second electrical machine;
the second rotational energy is not transferred between any of the turbine engine, the first electrical machine, and the second electrical machine; and
the third rotational energy is not transferred between the first gearbox and the second gearbox.

3. The system of claim 1, wherein, based on the mode of the system:
the first coupling device is in a coupling state and is configured to transfer the first rotational energy between the turbine engine and the first electrical machine;
the second coupling device is in a decoupling state, and the second rotational energy is not transferred between any of the turbine engine, the first electrical machine, and the second electrical machine; and
the third coupling device is in the decoupling state, and the third rotational energy is not transferred between the first gearbox and the second gearbox.

4. The system of claim 1, wherein, based on the mode of the system:
the first coupling device is in a coupling state and is configured to transfer the first rotational energy between the turbine engine and the first electrical machine;
the second coupling device is in the coupling state and is configured to transfer the second rotational energy between the turbine engine and the second electrical machine; and
the third coupling device is in an decoupling state, and the third rotational energy is not transferred between the first gearbox and the second gearbox.

5. The system of claim 1, wherein, based on the mode of the system:
the first coupling device is in an decoupling state, and the first rotational energy is not transferred between the turbine engine and the first electrical machine;
the second coupling device is in the decoupling state, and the second rotational energy is not transferred between the turbine engine and the second electrical machine; and
the third coupling device is in a coupling state and is configured to transfer the third rotational energy between the first gearbox and the second gearbox.

6. The system of claim 1, wherein, based on the mode of the system:
the first coupling device is in a coupling state and is configured to transfer the first rotational energy between at least two of the turbine engine, the first electrical machine, or the second electrical machine;
the second coupling device is in an decoupling state, and the second rotational energy is not transferred between the turbine engine and the second electrical machine; and
the third coupling device is in the coupling state and is configured to transfer the third rotational energy between the first gearbox and the second gearbox.

7. The system of claim 1, wherein, based on the mode of the system:
the first coupling device is in a coupling state and is configured to transfer the first rotational energy between at least two of the turbine engine, the first electrical machine, or the second electrical machine;
the second coupling device is in the coupling state and is configured to transfer the second rotational energy between at least two of the turbine engine, the first electrical machine, or the second electrical machine; and
the third coupling device is in the coupling state and is configured to transfer the third rotational energy between the first gearbox and the second gearbox.

8. The system of claim 1, wherein:
the first electrical machine comprises a low pressure machine; and
the second electrical machine comprises a high pressure machine.

9. The system of claim 1, wherein:
the first electrical machine and the second electrical machine each comprise a low pressure machine.

10. The system of claim 1, wherein:
the first electrical machine and the second electrical machine each comprise a high pressure machine.

11. The system of claim 1, further comprising a control device configured to, based on the mode of the system, control the set of coupling devices in association with at least one of:
mechanically coupling or decoupling the first gearbox and the turbine engine;
mechanically coupling or decoupling the second gearbox and the turbine engine; or
mechanically coupling or decoupling the first gearbox and the second gearbox.

12. The system of claim 1, wherein:
the first coupling device is mechanically coupled to a first spool of the turbine engine;
the second coupling device is mechanically coupled to a second spool of the turbine engine; and
the first spool and the second spool are independent of one another.

13. An apparatus comprising:
a set of coupling devices configured to mechanically couple or decouple a first electrical machine and a turbine engine based on a mode associated with the apparatus,
wherein the set of coupling devices comprises:
a first gearbox coupled to the first electrical machine;
a first coupling device between the first gearbox and the turbine engine;

a second gearbox coupled;
a second coupling device between the second gearbox and the turbine engine; and
a third coupling device between the first gearbox and the second gearbox, and wherein, based on the mode associated with the apparatus:
the first gearbox is configured to transfer first rotational energy between at least two of the turbine engine, the first electrical machine, or a second electrical machine;
the second gearbox is configured to transfer second rotational energy between at least two of the turbine engine, the first electrical machine, or the second electrical machine;
the third coupling device is configured to transfer third rotational energy between the first gearbox and the second gearbox; or
a combination thereof.

14. The apparatus of claim 13, wherein, based on the mode associated with the apparatus:
the first coupling device is in a coupling state and is configured to transfer the first rotational energy between the turbine engine and the first electrical machine;
the second coupling device is in a decoupling state, and the second rotational energy is not transferred between any of the turbine engine, the first electrical machine, and the second electrical machine; and
the third coupling device is in the decoupling state, and the third rotational energy is not transferred between the first gearbox and the second gearbox.

15. The apparatus of claim 13, wherein, based on the mode associated with the apparatus:
the first coupling device is in a coupling state and is configured to transfer the first rotational energy between the turbine engine and the first electrical machine;
the second coupling device is in the coupling state and is configured to transfer the second rotational energy between the turbine engine and the second electrical machine; and
the third coupling device is in an decoupling state, and the third rotational energy is not transferred between the first gearbox and the second gearbox.

16. The apparatus of claim 13, wherein, based on the mode associated with the apparatus:
the first coupling device is in an decoupling state, and the first rotational energy is not transferred between the turbine engine and the first electrical machine;
the second coupling device is in the decoupling state, and the second rotational energy is not transferred between the turbine engine and the second electrical machine; and
the third coupling device is in a coupling state and is configured to transfer the third rotational energy between the first gearbox and the second gearbox.

17. The apparatus of claim 13, wherein, based on the mode associated with the apparatus:
the first coupling device is in a coupling state and is configured to transfer the first rotational energy between at least two of the turbine engine, the first electrical machine, or the second electrical machine;
the second coupling device is in an decoupling state, and the second rotational energy is not transferred between the turbine engine and the second electrical machine; and
the third coupling device is in the coupling state and is configured to transfer the third rotational energy between the first gearbox and the second gearbox.

18. The apparatus of claim 13, wherein, based on the mode associated with the apparatus:
the first coupling device is in a coupling state and is configured to transfer the first rotational energy between at least two of the turbine engine, the first electrical machine, or the second electrical machine;
the second coupling device is in the coupling state and is configured to transfer the second rotational energy between at least two of the turbine engine, the first electrical machine, or the second electrical machine; and
the third coupling device is in the coupling state and is configured to transfer the third rotational energy between the first gearbox and the second gearbox.

19. A system comprising:
a first electrical machine;
a motor controller device coupled to the first electrical machine, wherein the motor controller device is configured to convert first power generated by the first electrical machine or provide second power to the first electrical machine;
a set of coupling devices configured to mechanically couple or decouple the first electrical machine and a turbine engine based on a mode of the system; and
a control device,
wherein the set of coupling devices comprises:
a first gearbox coupled to the first electrical machine;
a first coupling device between the first gearbox and the turbine engine;
a second gearbox;
a second coupling device between the second gearbox and the turbine engine; and
a third coupling device between the first gearbox and the second gearbox, and
wherein the control device is configured to, based on the mode of the system, selectively control the set of coupling devices in association with:
selectively mechanically coupling or decoupling the first gearbox and the turbine engine;
selectively mechanically coupling or decoupling the second gearbox and the turbine engine;
selectively mechanically coupling or decoupling the first gearbox and the second gearbox; or
a combination thereof.

* * * * *